United States Patent

Berger et al.

[11] Patent Number: 5,184,843
[45] Date of Patent: Feb. 9, 1993

[54] GAS BAG ASSEMBLY

[75] Inventors: Jürgen Berger, Mutlangen; Norbert Lang, Mulfingen, both of Fed. Rep. of Germany

[73] Assignee: TRW Repa GmbH, Alfdorf, Fed. Rep. of Germany

[21] Appl. No.: 780,148

[22] Filed: Oct. 22, 1991

[30] Foreign Application Priority Data

Oct. 25, 1990 [DE] Fed. Rep. of Germany ... 9014749[U]

[51] Int. Cl.⁵ .............................................. B60R 21/16
[52] U.S. Cl. ...................................... 280/728; 383/3; 220/404
[58] Field of Search ............... 280/743, 728, 730, 731, 280/732, 740, 736; 383/33; 220/404; 248/99

[56] References Cited

U.S. PATENT DOCUMENTS

| 3,514,125 | 5/1970 | Nemecek | 280/743 |
| 3,797,853 | 3/1974 | Grosch et al. | 280/740 |
| 4,111,457 | 9/1978 | Kob | 280/728 |
| 4,278,638 | 7/1981 | Nilsson | 422/166 |
| 4,810,005 | 3/1989 | Föhl | 280/732 |
| 4,986,569 | 1/1991 | Bruton | 280/743 |
| 5,062,664 | 11/1991 | Bishop | 280/732 |

FOREIGN PATENT DOCUMENTS 2319147 4/1973 Fed. Rep. of Germany ...... 280/728

Primary Examiner—Karin L. Tyson
Attorney, Agent, or Firm—Tarolli, Sundheim & Covell

[57] ABSTRACT

A gas bag is attached to an accommodating housing of a gas bag restraining system for vehicles on the front passenger side thereof. The gas bag is provided along the edge of its rectangular inflation opening with a sewn-in reinforcing element forming a bead. The edge provided with the reinforcing element is fixed to the accommodating housing with an interference fit by means of a profile element. The attachment provides high mechanical strength along with an improved gas tightness.

5 Claims, 3 Drawing Sheets

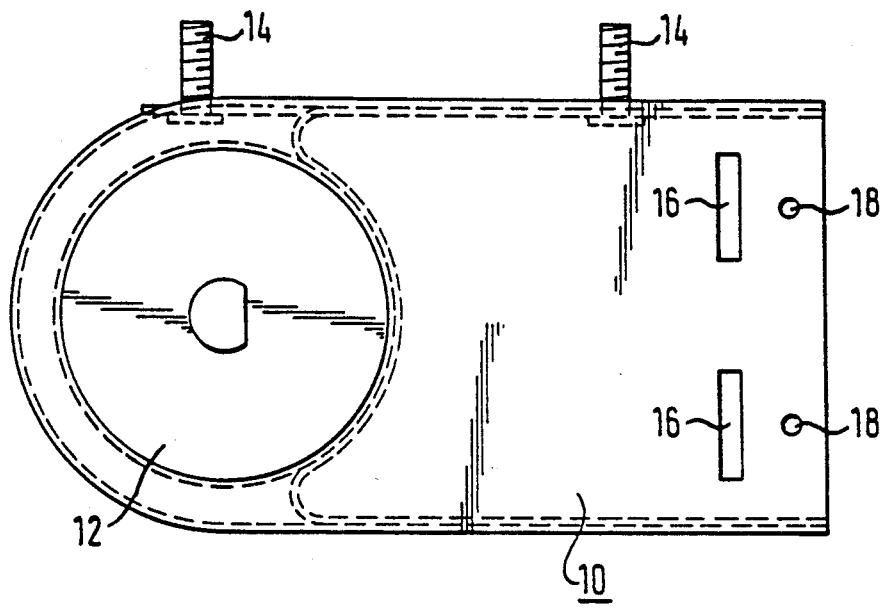
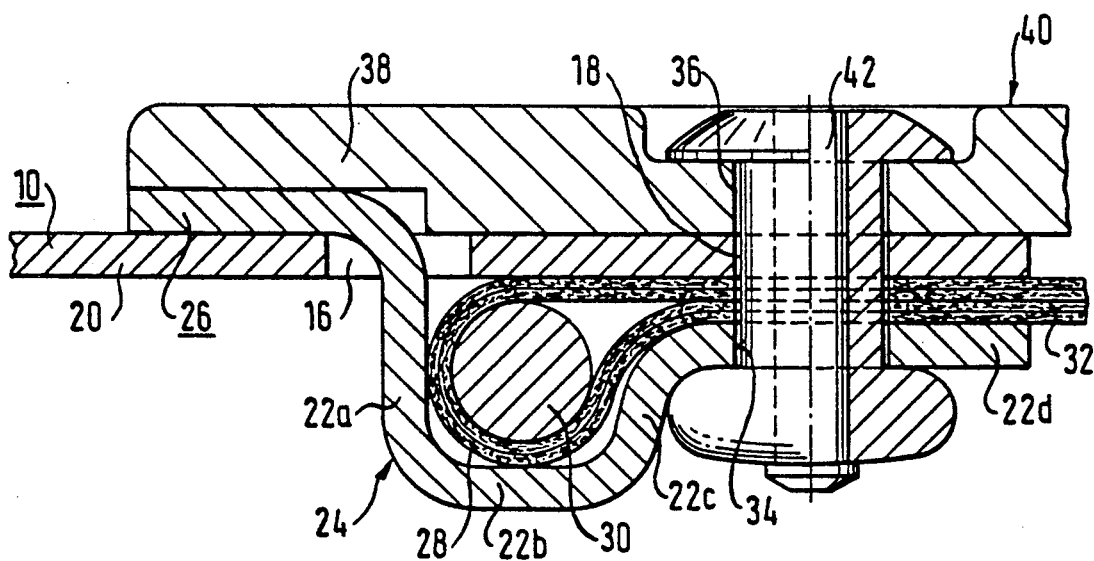

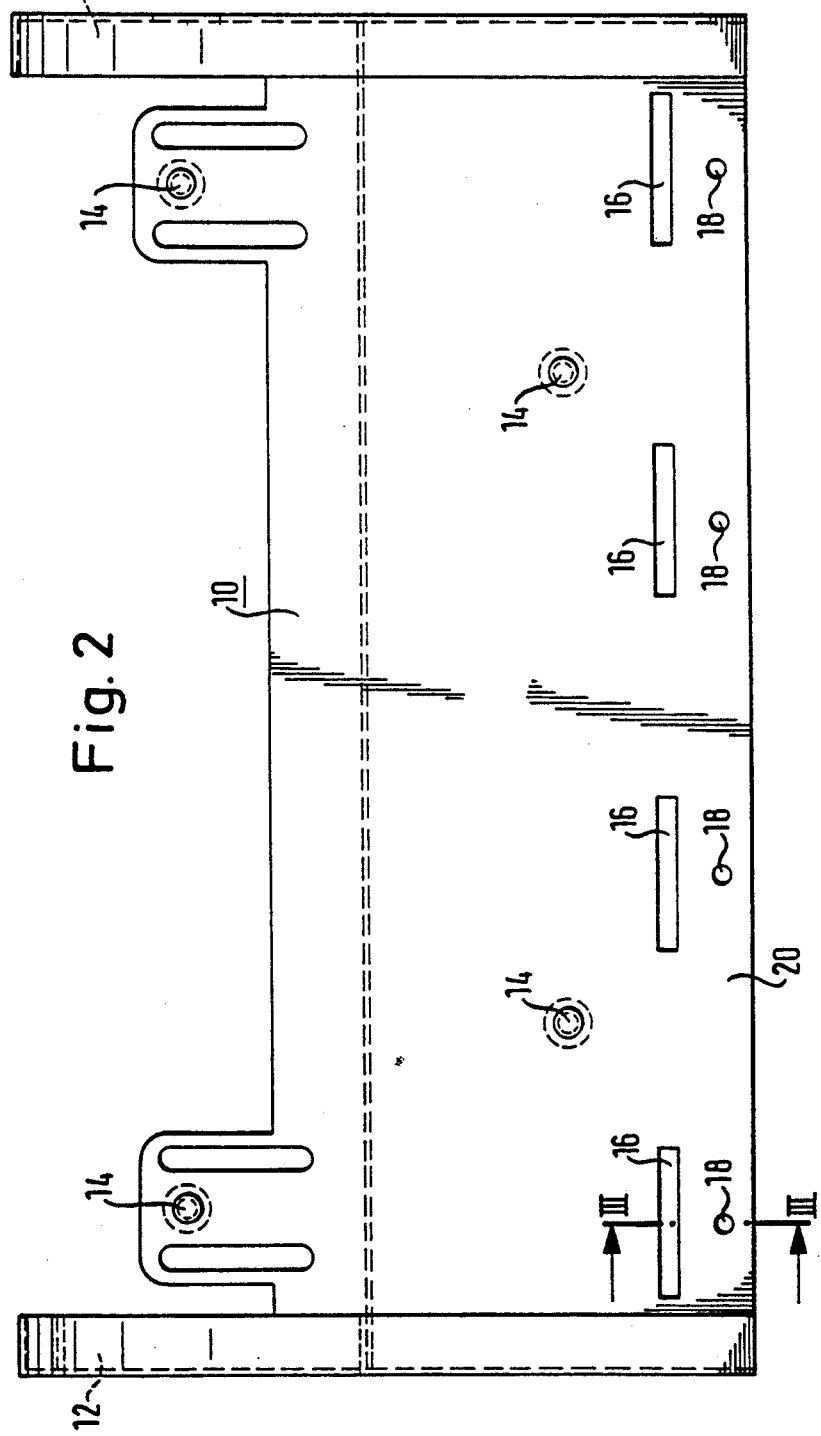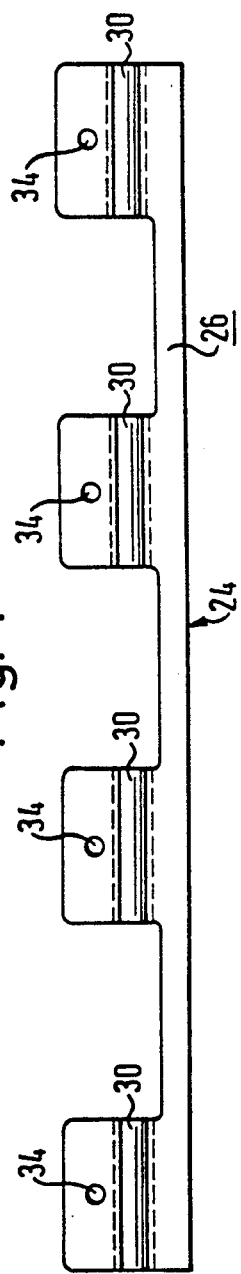

GAS BAG ASSEMBLY

TECHNICAL FIELD

The invention relates to a gas bag assembly for a gas bag restraint system in vehicles, in particular on the passenger front side, and more particularly, to an attachment of the gas bag to the accommodating housing of the gas bag restraining system.

BACKGROUND ART

The attachment of the gas bag to the accommodating housing of the gas bag restraining system is critical because it must withstand high mechanical stresses and be largely gas-tight. It is therefore accepted that complicated screw connections to the accommodating housing have to be made along the edge of the inflation opening of the gas bag.

SUMMARY OF THE INVENTION

The invention provides an attachment of a gas bag to the accommodating housing of a gas bag restraining system for vehicles which can be implemented with simple means and which meets high demands as regards the mechanical stressability and gas-tightness.

In the gas bag assembly of the invention, the gas bag is provided along the edge of its rectangular inflation opening with a sewn-in reinforcing element forming a bead. The edge provided with the reinforcing element is fixed to the accommodating housing with an interference fit by means of a profile element. Instead of numerous screw connections along the edge of the inflation opening of the gas bag, in the attachment according to the invention a few profile elements need only be brought into position and secured for example by rivets.

The profile element preferably comprises a plurality of attachment tabs engaging over the bead of the edge and provided with a center portion in the form of a groove and a strip-like end portion; the attachment tabs are provided with attachment openings and are secured to the housing by means of rivets passing through the attachment openings and corresponding bores of the housing. Assembly of the profile element on the accommodating housing is facilitated in that the attachment tabs are inserted into corresponding insert slots of the accommodating housing. Said slots act as hinge by guiding the profile element when folded over the bead of the edge of the gas bag.

BRIEF DESCRIPTION OF THE DRAWINGS

Further advantages and features of the invention will be apparent from the following description of a preferred embodiment and from the drawings to which reference is made and in which:

FIG. 1 shows a schematic side elevation of an accommodating housing of a gas bag restraining system for the front passenger side of a vehicle;

FIG. 2 is a plan view of the housing shown in FIG. 1;

FIG. 3 is a sectional view of the mounting of the gas bag on the accommodating housing to a much larger scale than FIGS. 1 and 2;

FIG. 4 is a plan view of a profile element of the attachment shown in FIG. 3.

DESCRIPTION OF PREFERRED EMBODIMENT

Figure 5:
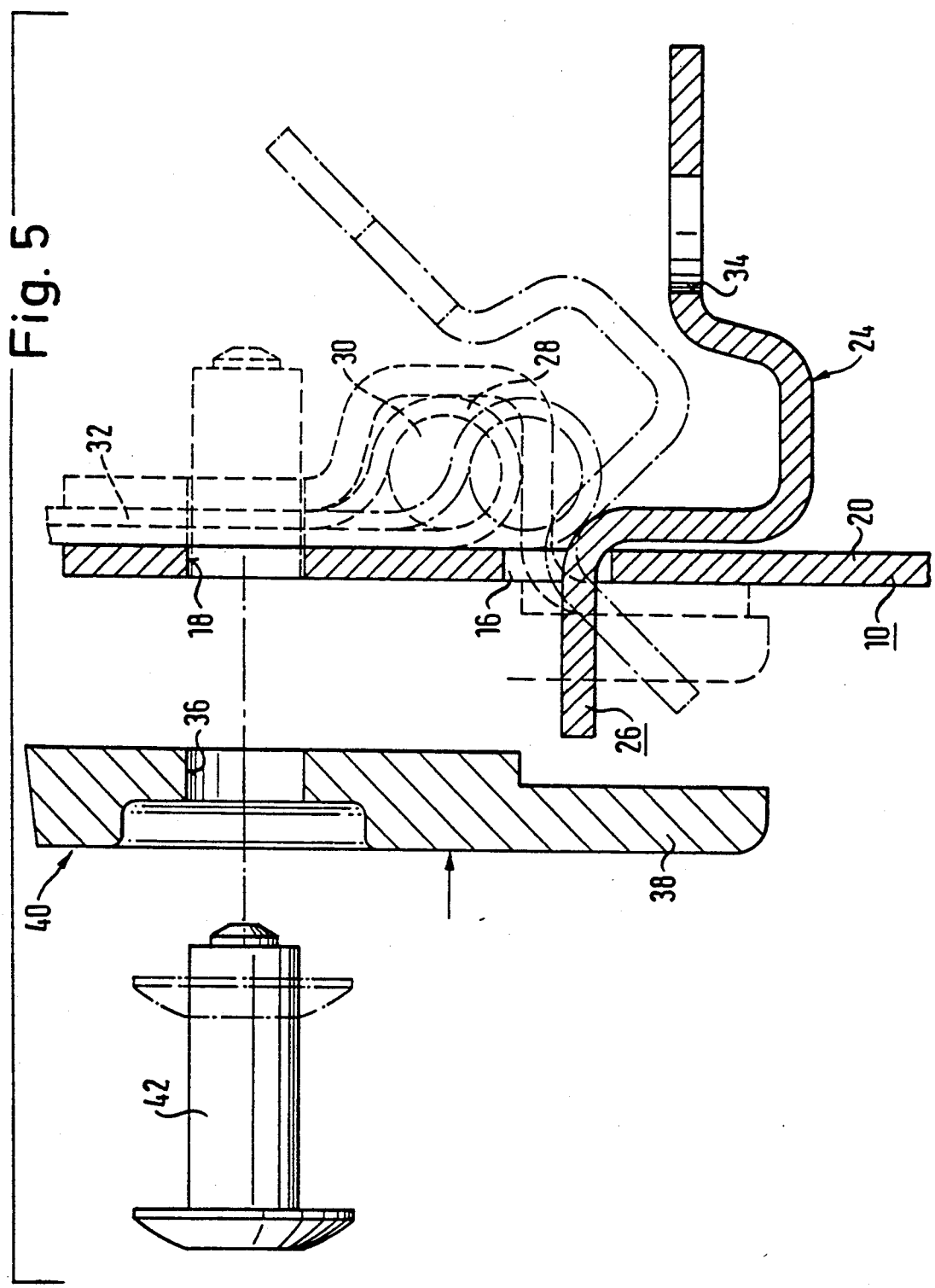
FIG. 5 is an exploded view for illustrating the assembly steps necessary for forming the attachment of FIG. 3.

The accommodating housing 10 shown in FIGS. 1 and 2 is of generally right parallelepiped form with an open front side and side walls which with a semicircularly rounded end project beyond the cuboid form of the accommodating housing 10. Between the ends of the side walls a cylindrical gas generator 12 is disposed. Threaded bolts 14 for attachment to the vehicle bodywork are provided at the upper side of the accommodating housing 10. Along the open front side of the accommodating housing 10 in the wall thereof insert slots 16 are formed each with an associated attachment opening 18, the function of which will be described below.

Apart from accommodating the gas generator 12 the interior of the accommodating housing 10 serves to accommodate the folded gas bag not shown in FIGS. 1 and 2.

The attachment of the gas bag to the accommodating housing 10 is illustrated in FIGS. 3 and 5. The section shown in FIG. 3 is cut substantially through the line III—III of FIG. 2. It shows the wall 20 of the accommodating housing 10 in the region of an insert slot 16 and an attachment opening 18. A profiled attachment tab 22 of a profile element 24 shown in FIG. 4 is inserted from the outside of the wall 20 through the insert slot 16. The profile element 24 consists of a flat, strip-like main portion 26 and a plurality of attachment tabs 22 arranged along a longitudinal edge thereof in spaced relationship with each other. Each attachment tab 22 consists of a first portion 22a bent at right-angles from the main portion 26, a second portion 22b bent at right-angles from the first portion 22a and parallel to the main portion 26, a third portion 22c bent at right-angles parallel to the portion 22a and an end portion 22d which is bent at right-angles from said portion 22c and parallel to the main portion 26 and forms a flat retaining lug. Said end portion or retaining lug 22d is parallel to the main portion 26 but offset with respect to the latter. The portions 22a, 22b and 22c of the profile element 24 form a generally groove or channel-like structure which engages with an interference fit over a bead 28 formed along the edge of the inflation opening of the gas bag. Said bead 28 is formed by a reinforcing ring 30 which is sewn into the hem of the edge and consists for example of a metal wire. The hem of the gas bag 32 consists of four fabric layers placed over each other in the region between the end portion 22d of the profile element 24 and the wall 20. The end portion 22d of the profile element 24 is provided with an attachment opening 34 which is in alignment with the corresponding attachment opening 18 of the wall 20 and an attachment opening 36 in the edge region 38 of a cover. Said cover 40, the edge region 38 of which is angled, closes the open front side of the accommodating housing 10. The aligning attachment openings 36, 18 and 34 are traversed by a rivet 42 which holds the edge region 38 of the cover, the wall 20, the hem of the gas bag 32 and the end portion 22d of the profile element 24 together. The edge portion 38 of the cover 40 also engages over the main portion 26 of the profile element 24.

The profile element 24 shown in FIG. 4 is made to match a longitudinal side of the accommodating housing 10 as can easily be seen by comparing FIGS. 2 and 4. In particular, the attachment tabs 22 are arranged to match the insert slots 16 and attachment openings 18 in the wall 20 of the accommodating housing 10. For the narrow sides of the accommodating housing 10 shorter profile or section elements are used and have only two attachment tabs to match the arrangement of the insert slots 16 and attachment openings 18 shown in FIG. 1.

As apparent from FIG. 5, the assembly takes place in the following order: Firstly, the attachment tabs 22 of the profile elements 24 are introduced from the outside of the accommodating housing 10 through the insert slots 16; then, the edge of the inflation opening of the gas bag 32 is placed with its bead 30 into the accommodating housing 10. Thereafter, the cover 40 is pushed over the open front side of the accommodating housing 10, its edge region 38 engaging over the main portion 26 of the profile elements 24. Finally, the rivets 42 are inserted through the attachment openings 36, 18 and 34 and upset. It will be apparent that this assembly can be carried out in a few steps which are also suitable for automation.

Numerous advantages over conventional attachment methods are obtained. By using the reinforcing element 30, which can be made as a closed steel ring, a considerable increase in the mechanical stressability is achieved, in particular in the corner regions of the inflation opening. The force distribution between air bag and accommodating housing is very uniform. The accommodating housing is additionally reinforced by the profile elements. The assembly is particularly simplified because with a joint riveting operation the cover 40, the accommodating housing 10, the gas bag 32 and the profile elements 24 can be joined together. The rivets may be relatively weakly dimensioned because they are only shear stressed. The assembly is further facilitated in that the attachment openings in the accommodating housing may be formed as slots, providing tolerance compensation. Finally, without appreciable constructional modifications it is possible to mount the profile elements not on the inside but on the outside of the accommodating housing 10.

We claim:

1. A gas bag assembly for a gas bag restraint system for a vehicle, said gas bag assembly comprising:
   an accommodating housing including a wall portion having openings, said wall portion having an inside and an outside;
   a gas bag accommodated in said housing, said gas bag having an edge defining a substantially rectangular inflation opening;
   at least one profile element for fixing said edge of said gas bag to said wall portion of said housing, said profile element including a flat, longitudinally extending main section and a plurality of tab sections spaced along said main section, each tab section having an opening and including a groove-shaped engaging portion, said tab section openings being aligned with said wall portion openings for passing rivets therethrough; and
   a sewn-in reinforcing element provided along said edge of said gas bag and forming a bead, said main section of said profile element extending along the outside of said wall portion and said engaging portions of said tab sections of said profile element engaging said bead with an interference fit on the inside of said wall portion when rivets are passed through said tab section openings and said wall portion openings.

2. A gas bag assembly according to claim 1 wherein each of said tab sections has a flat retaining lug on its side opposite to said main section, said wall portion of said housing being provided with aligned slots for inserting said retaining lugs of said tab sections, said main section of said profile element in said lugs of said tab sections extending on opposite sides of said wall portion.

3. A gas bag assembly according to claim 1 wherein said edge of said gas bag is formed by folding the border of said gas bag around said reinforcing element thereby forming a double layer web portion inside of said edge, said double layer web portion being clamped between said wall portion of said housing and said tab sections of said profile element, said rivets passing through said double layer web portion.

4. A gas bag assembly according to claim 1 wherein said housing has an open front side and a cover for closing said open front side, said cover having an angled edge portion extending over said main section of said profile element on the outside of said wall portion, said angled edge portion having openings aligned with the openings of said wall portion for passing said rivets therethrough.

5. A gas bag assembly according to claim 2 wherein said main section of said profile element and said retaining lugs of said profile element extend in parallel planes offset from each other.

* * * * *